United States Patent
Stegamat et al.

(10) Patent No.: US 6,756,176 B2
(45) Date of Patent: Jun. 29, 2004

(54) TONER PROCESSES

(75) Inventors: Reza Stegamat, Milpitas, CA (US); Valerie M. Farrugia, Oakville (CA); Richard P. N. Veregin, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/260,377

(22) Filed: Sep. 27, 2002

(65) Prior Publication Data

US 2004/0063020 A1 Apr. 1, 2004

(51) Int. Cl.⁷ .......................... G03G 9/087; C08J 3/215
(52) U.S. Cl. ................. 430/137.14; 430/137.1
(58) Field of Search ..................... 430/137.14, 137.1

(56) References Cited

U.S. PATENT DOCUMENTS

| | | | | |
|---|---|---|---|---|
| 4,558,108 A | 12/1985 | Alexandru et al. | ......... | 526/340 |
| 4,797,339 A | 1/1989 | Maruyama et al. | ......... | 430/109 |
| 4,983,488 A | 1/1991 | Tan et al. | .................... | 430/137 |
| 4,996,127 A | 2/1991 | Hasegawa et al. | ......... | 430/109 |
| 5,278,020 A | 1/1994 | Grushkin et al. | ........... | 430/137 |
| 5,290,654 A | 3/1994 | Sacripante et al. | ......... | 430/137 |
| 5,308,734 A | 5/1994 | Sacripante et al. | ......... | 430/137 |
| 5,593,807 A | 1/1997 | Sacripante et al. | ......... | 430/137 |
| 5,604,076 A | 2/1997 | Patel et al. | .................. | 430/137 |
| 5,648,193 A | 7/1997 | Patel et al. | ................. | 430/137 |
| 5,658,704 A | 8/1997 | Patel et al. | ................. | 430/137 |
| 5,660,965 A | 8/1997 | Mychajlowskij et al. | ... | 430/137 |
| 5,840,462 A | 11/1998 | Foucher et al. | ............. | 430/137 |
| 5,843,614 A | 12/1998 | Shinzo et al. | ............... | 430/137 |
| 5,853,944 A | 12/1998 | Foucher et al. | ............. | 430/137 |
| 5,858,601 A | 1/1999 | Ong et al. | ................... | 435/137 |
| 5,919,595 A | 7/1999 | Mychajlowskij et al. | ... | 430/137 |
| 5,925,488 A | 7/1999 | Patel et al. | ................. | 430/137 |
| 5,945,245 A | 8/1999 | Mychajlowskij et al. | ... | 430/137 |
| 5,977,210 A | 11/1999 | Patel et al. | .................. | 523/161 |
| 6,132,924 A | 10/2000 | Patel et al. | .................. | 430/137 |
| 6,254,929 B1 * | 7/2001 | Duff et al. | ................... | 427/222 |
| 6,593,049 B1 * | 7/2003 | Veregin et al. | .......... | 430/108.1 |
| 6,638,677 B2 * | 10/2003 | Patel et al. | ............ | 430/137.14 |

OTHER PUBLICATIONS

Copending Application Ser. No. 10/086,063, filed Mar. 1, 2002, on "Toner Processes" by Raj D. Patel et al.

* cited by examiner

*Primary Examiner*—John L Goodrow
(74) *Attorney, Agent, or Firm*—E. O. Palazzo

(57) ABSTRACT

A process comprising heating a resin latex and a colorant below about the glass transition temperature (Tg) of the resin; adding a metal stearate; and isolating the product; and wherein the heating generates an alkyl carboxylate metal salt component ionically attached to the surface of the product.

40 Claims, No Drawings

TONER PROCESSES

PENDING APPLICATIONS AND PATENTS

Illustrated in copending application U.S. Ser. No. 10/261,129 entitled Toners and Developers, filed Sep. 27, 2002 the disclosure of which is totally incorporated herein by reference, is a toner comprising at least one binder in an amount of from about 85 to about 99 percent by weight, at least one colorant in an amount of from about 0.5 to about 15 percent by weight, and calcium stearate in an amount of from about 0.05 to about 2 percent by weight, and wherein following triboelectric contact with carrier particles, the toner has a charge Q measured in femtocoulombs per particle diameter D measured in microns (Q/D) of from about −0.1 to about −1 fC/$\mu$m with a variation during development of from about 0 to about 0.25 fC/$\mu$m, and wherein the distribution is substantially unimodal and possesses a peak width of from about 0.1 fC/$\mu$m to about 0.5 fC/$\mu$m and the toner possesses a charge to mass M, as measured in grams, ratio (Q/M) of from about −25 to about −70 $\mu$C/gram with variation of Q/M during development of from about 0 to about 15 $\mu$C/gram.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

Illustrated in U.S. Pat. No. 6,638,677, entitled Toner Processes, the disclosure of which is totally incorporated herein by reference, is a process comprising heating a latex, a colorant dispersion, a polytetrafluoroethylene dispersion, and an organo metallic complexing component.

Illustrated in U.S. Pat. No. 5,945,245, the disclosure of which is totally incorporated herein by reference, is a process for the preparation of toner compositions comprising:

(i) preparing an emulsion latex comprised of sodio sulfonated polyester resin particles of from about 5 to about 500 nanometers in size diameter, by heating said resin in water at a temperature of from about 65° C. to about 90° C.;

(ii) preparing a pigment dispersion in water by dispersing in water from about 10 to about 25 weight percent of sodio sulfonated polyester, and from about 1 to about 5 weight percent of pigment;

(iii) adding the pigment dispersion to a latex mixture comprised of sulfonated polyester resin particles in water with shearing, followed by the addition of an alkali halide in water until aggregation results, as indicated by an increase in the latex viscosity of from about 2 centipoise to about 100 centipoise;

(iv) heating the resulting mixture at a temperature of from about 45° C. to about 55° C., thereby causing further aggregation and enabling coalescence, resulting in toner particles of from about 4 to about 9 microns in volume average diameter and with a geometric distribution of less than about 1.3; and optionally (v) cooling the product mixture to about 25° C. and followed by washing and drying.

BACKGROUND

The present invention is directed to a toner process, and more specifically, to chemical toner processes which involve the aggregation and fusion of latex, colorant like pigment or dye, and additive particles.

In embodiments, the present invention is directed to toner compositions and processes thereof, wherein the surface layer of the toner is comprised of a linear sulfonated polyester resin rendered hydrophobic by a wet chemical surface treatment with aqueous solutions of various water soluble alkyl carboxylate metal salts or water insoluble fatty acid metal salts thereby, for example, reducing excessive C-zone charge (20 percent relative humidity) from about −175 microcoulombs per gram to about +13 microcoulombs per gram. More specifically, in embodiments the present invention relates to toner processes wherein there is selected a metal stearate like calcium stearate, and which stearate, for example, reduces excessive negative C-zone charge to thereby provide excellent toner relative humidity (RH) sensitivity, which stearate is also effective at low, for example from about 0.0025 to about 3 percent by weight of the toner components, and which can tune the charging properties of the toner, for example change the toner charge from a positive charge to a negative charge and further wherein the calcium stearate can provide in embodiments excellent flowing toners and toners free or substantially free of undesirable clumping.

The toners generated with the processes of the present invention can be selected for copying and printing processes, including color processes, and for imaging processes, and which toners can provide, for example, high quality colored images with excellent image resolution, acceptable signal-to-noise ratio, and image uniformity. Also, the toners obtained with the processes illustrated herein can be selected for digital imaging systems and processes.

REFERENCES

In xerographic systems, especially color systems, small sized toners of, for example, from about 2 to about 8 microns can be important to the achievement of high image quality for process color applications. It is also important to have a low image pile height to eliminate, or minimize image feel and avoid paper curling after fusing. Paper curling can be particularly pronounced in xerographic color processes primarily because of the presence of relatively high toner coverage as a result of the application of three to four color toners. During fusing, moisture escapes from the paper due to high fusing temperatures of from about 120° C. to about 200° C. In the situation wherein only one layer of toner is selected, such as in one-color black or highlight color xerographic applications, the amount of moisture driven off during fusing can be reabsorbed by the paper, and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, it may be useful to select certain toner particle sizes, such as from about 2 to about 10 microns, with a high colorant, especially pigment loading, such as from about 4 to about 15 percent by weight of toner, so that the mass of toner necessary for attaining the required optical density and color gamut can be significantly reduced to eliminate or minimize paper curl. Lower toner mass also ensures the achievement of image uniformity. However, higher pigment loadings often adversely affect the charging behavior of toners. For example, the charge levels may be too low for proper toner development or the charge distributions may be too wide and toners of wrong charge polarity may be present. Furthermore, higher pigment loadings may also result in the sensitivity of charging behavior to charges in environmental conditions, such as temperature and humidity. Toners prepared in accordance with the processes of the present invention minimize, or avoid these disadvantages.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. In U.S. Pat. No. 4,797,339, the disclosure of which is totally incorporated herein by reference, there is disclosed a process for the preparation of toners by resin emulsion polymerization wherein similar to the '127 patent certain polar resins are selected; and in U.S. Pat. No. 4,558,108, the disclosure of which is totally incorporated herein by reference, there is disclosed a process for the preparation of a copolymer of styrene and butadiene by specific suspension polymerization.

Polyester based chemical toners substantially free of encapsulation are also known, reference U.S. Pat. No. 5,593,807, the disclosure of which is totally incorporated herein by reference, wherein there is disclosed a process for the preparation of a toner comprised of a sodio sulfonated polyester resin and pigment, and wherein the aggregation and coalescence of resin particles is mediated with an alkali halide. Other U.S. patents that may be of interest, the disclosures of which are totally incorporated herein by reference, are U.S. Pat. Nos. 5,853,944; 5,843,614; 5,840,462; 5,604,076; 5,648,193; 5,658,704; and 5,660,965.

Emulsion/aggregation/coalescence processes for the preparation of toners are illustrated in a number of Xerox Corporation patents, the disclosures of each of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488; 5,858,601, and 5,977,210. The appropriate components and processes of the above Xerox Corporation patents can be selected for the processes of the present invention in embodiments thereof.

With respect to the prior art, only a part thereof has been selected and this part may or may not be fully representative of the prior art teachings or disclosures.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant dispersions, thus enabling the achievement of excellent color print quality; and a simple and economical chemical process for the preparation of toner compositions with, for example, a polyester core with incorporated colorant and a surface layer or shell thereover of water soluble alkyl carboxylate metal salts or water insoluble fatty acid metal salts.

Additionally, another feature of the present invention resides in a process capable of delivering differing toner morphology particles, such as spherically shaped toner particles.

Moreover, in another feature of the present invention there are provided emulsion, aggregation, coalescence processes wherein, for example, the toner obtained has incorporated during the process, that is, for example, subsequent to aggregation and coalescence, calcium stearate and wherein the resulting toners can be selected for use with single layered photoreceptor imaging members.

Aspects of the present invention relate to a process for the preparation of a colloidal solution of a sulfonated polyester resin by heating water, adding a sulfonated polyester resin to the heated water, and cooling. More specifically, a colorant can be added to the colloidal solution, followed by heating the resulting mixture to a temperature equal to or higher than the resin glass transition temperature; an aqueous solution of either an alkaline earth metal (II) salt or a transition metal salt is then added to the heated colloidal solution, whereby the coalescence and ionic complexation of sulfonated polyester colloid, colorant, and metal cation occur until the particle size of the composite is, for example, from about 3 to about 15 microns in volume average diameter with a geometric distribution of from about 1.13 to about 1.23; mixing the resulting product with a metal stearate like calcium stearate, magnesium stearate, aluminum stearate, zinc stearate, and the like; optionally isolating the toner; and wherein the calcium toner resides on the surface of the toner; a process wherein the latex is a latex emulsion comprised of resin, water, and an ionic surfactant, and wherein the colorant mixture is a dispersion containing a colorant, water, and an ionic surfactant; a process wherein there is selected for the ionic surfactant a nonionic surfactant; a process wherein the stearate, such as calcium stearate is selected in an amount of from about 0.005 to about 3 percent by weight of the toner components; a process wherein the calcium stearate is selected in an amount of from about 0.05 to about 1 percent by weight of the toner components; a process wherein each of the surfactants is selected in an amount of from about 1 to about 10 weight percent based on the toner components amounts; a process wherein there can optionally be added to the mixture a second latex, and which latex is comprised of submicron resin particles suspended in an aqueous phase containing an ionic surfactant, and wherein the second latex is optionally selected in an amount of from about 10 to about 40 percent by weight of the initial latex; a process wherein the temperature about below the latex resin Tg is from about 40° C. to about 60° C., thereby resulting in toner aggregates, and the temperature above about the latex resin Tg is from about 75° C. to about 97° C.; a process wherein the temperature at which the aggregation is accomplished controls the size of the aggregates, and wherein the toner isolated is of from about 2 to about 15 microns in volume average diameter; a process wherein the colorant is a pigment; a process wherein the latex contains a polyester, such as polyester SPE2, available from Hercules Chemical; a toner comprised of a sulfonated polyester resin, colorant, and thereover a alkyl carboxylate metal salt, especially a cation, chemically bound or surface adsorbed on to the toner surface, that is, for example, chemically bound or surface adsorbed to the sulfonated polyester; a toner wherein the metallo component is a cation of a alkyl carboxylate; a toner wherein the polyester is of the formula

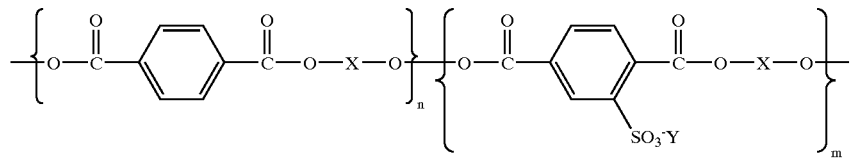

wherein Y is an alkali metal, X is a glycol, and n and m each represent the number of segments; a toner wherein the polyester is a sodiosulfonated polyester; a toner wherein the water soluble alkyl carboxylate metal salt or water insoluble fatty acid metal salt component is chemically bound or surface adsorbed to the toner surface; a toner comprised of a resin, colorant and a water soluble alkyl carboxylate metal salt or water insoluble fatty acid metal salts; a toner process comprising (i) preparing a colloidal solution of a sulfonated polyester resin by heating water at a temperature of from about 75° C. to about 95° C., adding thereto a sulfonated polyester resin, and cooling; (ii) adding thereto a colorant, followed by heating the resulting mixture to a temperature equal to or higher than the resin glass transition temperature; (iii) adding thereto an aqueous solution of either an alkaline earth metal (II) salt or a transition metal salt whereby the coalescence and ionic complexation of sulfonated polyester colloid, colorant, and metal cation occur until the particle size of the composite is from about 3 to about 10 microns in volume average diameter with a geometric distribution of from about 1.13 to about 1.23, wherein the wet toner solids of from about 3 to about 10 microns in size are redispersed in water, forming a slurry of from about 15 to about 25 percent by weight of toner solids; (iv) followed by chemically treating toner particles in the heated aqueous slurry at temperatures of from about 25° C. to about 60° C. with an aqueous solution containing from about 0.005 to about 5 percent by weight of toner of an alkyl carboxylate metal salt or calcium stearate; a process wherein the toner is isolated, filtered, washed with water, and dried; a toner wherein the polyester is present in an amount of from about 80 to about 98 percent by weight of the toner; the colorant is present from an amount of from about 2 to about 20 weight percent of the toner; and wherein the stearate is a calcium stearate, and the salt thereof, such as a carboxylate metal salt is present on the surface of the toner; the alkyl carboxylate metal salt component is present in an amount of from about 0.0025 to about 5 weight percent of the toner; a toner wherein the alkyl carboxylate component is a salt and forms a surface layer either chemically bound or surface adsorbed on the resin and the colorant; a toner wherein the surface layer is of a thickness of from about 0.01 to about 0.2 micron; a toner wherein the polyester resin contains from about 0.1 to about 5 weight percent of sulfonated groups; a toner wherein the alkyl carboxylate metal salt is of the formula $$M^+R_1$$

wherein $R_1$ is an alkyl carboxylate such as stearic acid, and M is a metal such as sodium, potassium, cesium, rubidium, lithium, beryllium, magnesium, calcium, barium; a toner wherein the salt is sodium stearate, potassium stearate, cesium stearate, rubidium stearate, lithium stearate, beryllium stearate, magnesium stearate, calcium stearate, barium stearate and the like; stearate compounds with carbon chain lengths $C_8$ to $C_{20}$ with metals stated above; a toner wherein the salt is present in an amount of from about 0.005 to about 5 weight percent of the toner; a toner wherein the salt primarily functions to enhance the triboelectric charge and reduce the toner relative humidity sensitivity; a toner comprised of a polyester resin, colorant, and an alkyl carboxylate metal salt; a toner wherein the polyester is a sodiosulfonated polyester; a toner wherein the alkyl carboxylate metal salt is chemically bound on to the toner surface; a toner comprised of at least one resin, colorant, and an alkyl carboxylate metal salt; a toner wherein the alkyl carboxylate is comprised of the metal salts of a water soluble alkyl carboxylate; a toner comprised of a colorant and a polyester alkyl carboxylate metal salt of the formula

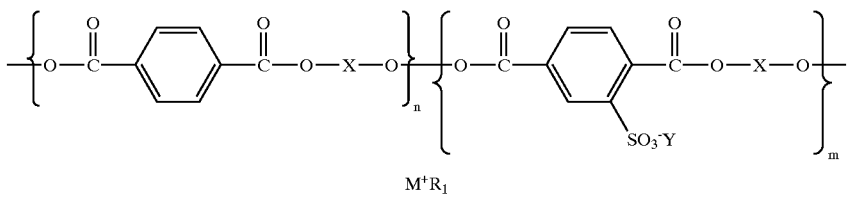

wherein R is alkyl carboxylate such as stearic acid; M is a metal such as sodium, potassium, cesium, rubidium, lithium, beryllium, magnesium, calcium, barium; X is a glycol or is generated from glycol; and m and n represent the number of segments; a toner comprised of a metal-complexed sulfonated polyester resin, colorant and a layer comprised of ionic complexes formed between the anionic sulfonate groups on the metal complexed polyester resin and alkyl carboxylate metal salt cations; a process wherein the metal-complexed sulfonated polyester resin core of the toner is, for example, comprised of a metal-complexed sulfonated polyester resin, colorant, and a layer comprised of ionic complexes formed between the anionic sulfonate groups on the metal complexed polyester resin and alkyl carboxylate metal salt cations; a process for the preparation of toner comprising mixing a latex with a colorant mixture comprised of colorant, and an ionic surfactant; heating the resulting mixture below about the glass transition temperature (Tg) of the latex resin; heating above about the Tg of the latex resin; mixing the resulting product with a metal stearate like calcium stearate, magnesium stearate, aluminum stearate, zinc stearate, and the like, and optionally isolating the toner, and wherein the calcium toner resides on the surface of the toner; a process wherein the latex is a latex emulsion comprised of resin, water, and an ionic surfactant, and wherein the colorant mixture is a dispersion containing a colorant, water, and an ionic surfactant; a process wherein there is selected for the ionic surfactant a nonionic surfactant; a process wherein the calcium stearate is selected in an amount of from about 0.005 to about 3 percent by weight of the toner components; a process wherein the calcium stearate is selected in an amount of from about 1 to about 1 percent by weight of the toner components; a process wherein each of the surfactants is selected in an amount of from about 1 to about 7 weight percent based on the toner component amounts; a process wherein there can optionally be added to the mixture a second latex, and which latex is comprised of submicron, about 0.05 to about 1, resin particles suspended in an aqueous phase containing an ionic surfactant, and wherein the second latex is selected in an amount of from about 10 to about 30 percent by weight of the initial latex; a process wherein the temperature about below the latex resin Tg is from about 40° C. to about 65° C., thereby resulting in toner aggregates, and the temperature above about the latex resin Tg is from about 77° C. to about 95° C.; a process wherein the temperature at which the aggregation is accomplished controls the size of the aggregates, and wherein the toner isolated is from about 2 to about 15 microns in volume average diameter; a process wherein the latex resin is selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl, acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a process wherein the colorant is carbon black, cyan, yellow, magenta, or mixtures thereof, and the toner isolated is from about 2 to about 25 microns in volume average diameter, and the particle size distribution thereof is optionally from about 1.15 to about 1.30, and wherein there is optionally added to the surface of the formed toner metal salts, metal salts of fatty acids, silicas, metal oxides, or mixtures thereof, each in an amount of from about 0.1 to about 10 weight percent of the obtained toner; a process wherein the colorant is a colorant dispersion comprised of (i) a colorant, water, an ionic surfactant, a nonionic surfactant or mixtures of an ionic surfactant, and a nonionic surfactant; the latex is a latex emulsion; and wherein the (ii) colorant dispersion is blended with the latex emulsion comprised of resin, a nonionic surfactant and an ionic surfactant, and optionally adding a wax dispersion comprised of submicron particles in the diameter size range of from about 0.1 to about 0.4 micron dispersed in an ionic surfactant of the same charge polarity as that of the ionic surfactant in the colorant dispersion or latex emulsion;

(iii) heating the resulting mixture below about, or about equal to the glass transition temperature (Tg) of the latex resin to form toner sized aggregates;

(iv) heating the resulting aggregate suspension above about the Tg of the latex resin; adding a stearate like calcium stearate and isolating the toner which toner contains the calcium stearate on the surface thereof; a process for the preparation of toner comprising (i) providing or generating a latex emulsion of resin, water, and an ionic surfactant, and providing or generating a colorant dispersion containing a colorant, water, an ionic surfactant, or a nonionic surfactant;

(ii) optionally providing or generating a wax dispersion containing an anionic surfactant similarly charged to that of the latex surfactant emulsion;

(iii) blending (ii) with the colorant dispersion;

(iv) heating the resulting mixture below the glass transition temperature (Tg) of the latex resin;

(v) heating (vii) above about the Tg of the latex resin;

(vi) followed by the addition of calcium in an amount of from about 0.5 to about 1 weight percent;

(vii) retaining the mixture (vi) at a temperature of from about 70° C. to about 95° C. for about 3 to about 10 hours;

(viii) washing the resulting toner slurry; and (ix) isolating the toner; a process wherein the added latex contains the same resin as the initial latex of (i), or wherein the added latex contains a dissimilar resin than that of the initial latex resin (i); a process wherein aggregation of latex resin and colorant is accomplished by heating at a temperature below the glass transition temperature of the resin or polymer contained in the latex, and coalescence is accomplished by heating at a temperature of above the glass transition temperature of the polymer contained in the latex (i) to enable fusion or coalescence of colorant and latex resin, followed by the mixing of the composition resulting composition with calcium stearate; a process wherein the aggregation temperature is from about 40° C. to about 60° C., and the coalescence temperature is from about 75° C. to about 97° C.; a process wherein the temperature at which the aggregation is accomplished controls the size of the aggregates, and wherein the toner isolated is from about 2 to about 10 microns in volume average diameter; a process for preparing toner particles comprising (i) providing or generating a latex emulsion of resin, water, and an anionic surfactant; a process wherein the latex emulsion comprises submicron resin particles in the size range of about 100 to about 500 nanometers, and more specifically, in the size range of about 150 to about 400 nanometers in water and an ionic surfactant, and more specifically, an anionic surfactant; the colorant dispersion comprises submicron pigment particle of about 50 to about 250 nanometers and more specifically, of about 80 to about 200 nanometers in size; a toner process wherein the cationic surfactant comprises, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and which coagulant surfactant component is selected in an amount of, for example, from about 0.01 to about 10 percent by weight of toner; a process wherein there is added during or subsequent to (v) a second latex, and which latex is comprised of submicron resin particles suspended in an aqueous phase containing an ionic surfactant, and wherein the second latex is optionally selected in an amount of about 15 to about 35 percent by weight of the initial latex; a process wherein the second latex (vi) is added and enables formation of a coating on the resulting toner aggregates of (v), and wherein the thickness of the formed coating is from about 0.1 to about 1 micron; a process wherein the aggregation temperature is from about 50° C. to about 60° C., and the coalescence temperature is from about 80° C. to about 95° C.; a process wherein the latex (i) or added latex contains a resin selected from the group consisting of a number of suitable know resins, or polymers, and more specifically poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylonitrile-acrylic acid); a process wherein the toner colorant is carbon black, cyan, yellow, magenta, or mixtures thereof, and the toner isolated is from about 1 to about 25 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner.

The surface of the toner can be represented by the general formula illustrated magnesium, calcium, barium, and the like; Y is a monovalent alkali Group I metal ion $M^{n+}$, for example lithium, sodium, and potassium; Y is a divalent alkaline earth Group II metal ion of, for example beryllium, magnesium, calcium, and barium; Y is a multivalent transition metal ion, for example scandium, yttrium, lanthanides, titanium, zirconium, hafnium, vanadium, chromium, niobium, tantalum, molybdenum, tungsten, manganese, rhenium, iron, ruthenium, osmium, cobalt, rhodium, iridium, nickel, palladium, copper, platinum, silver, gold, zinc, cadmium, mercury, aluminum, or mixtures thereof. The substituent X can represent alkyl groups generated from a glycol monomer, wherein the glycol is neopentyl glycol, ethylene glycol, propylene glycol, butylene glycol, diethylene glycol, dipropylene glycol, or mixtures thereof, and n and m represent the number of segments.

The present invention also relates to a toner wherein the resin surface layer is a water soluble alkyl carboxylate metal salt or water insoluble fatty acid metal salt of a resin comprised of copoly(1,2-propylene-dipropylene-5-sulfoisophthalate)-copoly(1,2-propylene-dipropylene terephthalate), or copoly(1,2-propylene-diethylene-5-sulfoisophthalate)-copoly(1,2-propylene-diethylene terephthalate), or copoly(1,2-dipropylene-diethylene-5-sulfoisophthalate)-copoly(1,2-dipropylene-diethylene terephthalate), or mixtures thereof; a toner wherein segments n and m represent about 10 to about 30 each, and wherein the weight average molecular weight of the polyester is from about 2,000 grams per mole to about 100,000 grams per mole, the number average molecular weight is from about 1,000 grams per mole to about 50,000 grams per mole, and the polydispersity thereof is from about 2 to about 18 as measured by gel permeation chromatography.

The process of the present invention comprises, for example, (i) mixing a colloidal solution of a sodiosulfonated polyester resin with a particle size of from about 10 to about 80 nanometers, and preferably from about 10 to about 40 nanometers, and colorant; (ii) adding thereto an aqueous solution containing from about 1 to about 10 percent by weight in water at neutral pH of a coalescence agent comprised of an ionic salt of the Group II or Group XIII metals, or the transition metals of Groups II to XII, such as for example, the halide (fluoride, chloride, bromide, iodide), acetate, or sulfate salts of zinc, copper, cadmium, manganese, vanadium, nickel, niobium, chromium, iron, Scheme 3

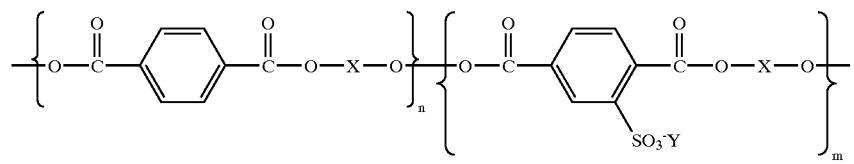

$Y = M^+R_1$ or metal ion $M^{n+}$
$M^{n+}$ = metal ions from Groups I to XIII wherein the substituents, such as R, M, n, m and X are as illustrated herein; wherein Y is $M^+R_1$; R is an alkyl carboxylate of, for example, sodium octanoate, lithium palmitate, magnesium stearate, sodium palmitate, calcium 2-ethylhexanoate, sodium butyrate and calcium propionate, or wherein said alkyl is $C_8$ to $C_{20}$ (with from about 8 to about 20 carbon atoms), for example methyl, ethyl, propyl, butyl, decyl, stearyl and the like; M is a metal such as sodium, potassium, cesium, rubidium, lithium, beryllium, zirconium, scandium, and the like; (iii) optionally cooling and optionally adding to the toner composition formed wax, charge additive, and surface flow additives; (iv) isolating, filtering, washing the toner, and optionally drying; (v) and wherein the wet toner solids are redispersed in water and chemically treated at elevated temperatures of from about 30° C. to about 56° C. with an aqueous solution containing from about 0.005 to about 5.0 percent by weight of toner of an alkyl carboxylate metal salt; and (vi) isolating the chemically surface-treated toner, filtering and washing with water, and drying the toner.

In embodiments, the present invention relates to a toner comprised of a sulfonated polyester resin and colorant, and wherein the toner is prepared by (i) generating a colloidal solution of a sodio-sulfonated polyester resin present, for example, in an amount of about 300 grams in 2 liters of water by heating the mixture at, for example, from about 20° C. to about 40° C. above the polyester polymer glass transition, thereby forming a colloidal solution of submicron particles in the size range of, for example, from about 10 to about 70 nanometers; (ii) adding thereto a colorant such as Pigment Blue 15:3™, available from Sun Chemicals, in an amount of, for example, from about 3 to about 5 percent by weight of toner; (iii) heating the resulting mixture to a temperature of from about 50° C. to about 60° C., and adding thereto an aqueous solution of a metal salt, such as zinc acetate, for example, at 5 percent by weight in water at a rate of from about 1 to about 2 milliliters per minute, whereby the coalescence and ionic complexation of sulfonated polyester colloid and colorant occur until the particle size of the core composite is, for example, from about 3 to about 6 microns in diameter (volume average throughout unless otherwise indicated or inferred) with a geometric distribution of from about 1.13 to about 1.23 as measured by a Coulter Counter; (iv) cooling the reaction mixture to about room temperature, filtering, washing with water, and drying to provide a toner comprised of a sulfonated polyester resin and colorant, and wherein the particle size of the toner composite is, for example, from about 3 to about 6 microns in diameter with a geometric distribution of from about 1.13 to about 1.23 as measured by the Coulter Counter. The present invention also provides a method for the chemical surface treatment of toner particles with about 0.04 percent by weight of an alkyl carboxylate metal salt, such as, for example, calcium stearate, wherein about 100 grams of the wet toner composite particles are dispersed in about 0.5 liter of water to obtain a slurry containing, for example, about 20 percent by weight of toner solids. The toner slurry can then be gently stirred and heated to a temperature of from about 30° C. to about 55° C., and typically of from about 38° C. to about 52° C., after which about 500 milliliters of an aqueous solution of from about 0.008 to about 5 percent by weight, and typically of from about 0.01 to about 0.08 percent by weight of calcium stearate is added slowly at a rate of from about 0.5 to about 1 milliliter per minute. The treated toner slurry is then subsequently stirred for about 30 to about 60 additional minutes, followed by cooling to room temperature, sieving and filtering, washing with water, and drying to provide a toner comprised of a core of sulfonated polyester resin and colorant, and a surface layer of sulfonated polyester ionically complexed with alkyl carboxylate metal salts, and wherein the particle size of the toner composite is from about 3 to about 10 microns in diameter with a geometric distribution of from about 1.10 to about 1.25 as measured by the Coulter Counter.

The polyester is preferably a sodio sulfonated polyester resin as illustrated in, for example, U.S. Pat. Nos. 5,348,832; 5,853,944; 5,840,462; 5,660,965; 5,658,704; 5,648,193; and 5,593,807, the disclosures of each patent being totally incorporated herein by reference.

Examples of polyester resins are as indicated herein and in the appropriate U.S. patents recited, and more specifically, examples of a number of polyesters are the beryllium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), the magnesium salt of copoly(1,2 dipropylene-5-sulfoisophthalate)-copoly(1,2-propylene terephthalate), the magnesium salt of copoly(1,3-butylene-5-sulfoisophthalate)-copoly(1,3-butylene terephthalate), the calcium salt of copoly(1,2 dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulfoisophthalate)-copoly (1,2-propylene-diethylene terephthalate), the nickel salt of copoly(1,2 dipropylene-5-sulfoisophthalate)-copoly(1,2-propylene terephthalate), the iron salt of copoly(1,3-butylene-5-sulfoisophthalate)-copoly(1,3-butylene terephthalate), the zirconium salt of copoly(1,2-dipropylene-5-sulfoisophthalate)-copoly(1,2-propylene terephthalate), the chromium salt of copoly(1,3-butylene-5-sulfoisophthalate)-copoly(1,3-butylene terephthalate), and the like.

Examples of the water soluble alkyl carboxylate metal salt can be, for example, a metal stearate compound, such as sodium stearate (can also form water insoluble metal salt colloidal particles), potassium stearate, cesium stearate, rubidium stearate, lithium stearate, beryllium stearate, magnesium stearate, calcium stearate, barium stearate, aluminum stearate, zinc stearate, and the like compounds, and mixtures thereof. Other water soluble organic carboxylate metal salts, such as homologs and analogs of water soluble metal stearate compounds, can be substituted to achieve the same or similar results as those achieved with metal stearate compounds or alkyl carboxylate salts such homologs and analogs possessing an alkyl length of $C_8$ to $C_{20}$ (with about 8 to about 20 carbon atoms) fatty acid, for example methyl, ethyl, propyl, butyl, decyl, stearyl, and the like ($C_{8-20}H_{16-40}O_2$).

Various known colorants, especially pigments, present in the toner in an effective amount of, for example, from about 1 to about 65, and more specifically from about 2 to about 35 percent by weight of the toner, and more specifically in an amount of from about 1 to about 15 weight percent, and wherein the total of all toner components is about 100 percent, include carbon is black like REGAL 330®; magnetites such as Mobay magnetites MO8029™, MO8060™; and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, Cyan 15:3, Magenta Red 81:3, Yellow 17, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of specific cyans that may be selected include copper tetra (octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative specific examples of yellows that may be selected are Diarylide Yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy- 4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein.

More specifically, colorant examples include Pigment Blue 15:3 having a Color Index Constitution Number of 74160, Magenta Pigment Red 81:3 having a Color Index Constitution Number of 45160:3, and Yellow 17 having a Color Index Constitution Number of 21105, and known dyes such as food dyes, yellow, blue, green, red, magenta dyes, and the like. Colorants include pigments, dyes, mixtures of pigments, mixtures of dyes, mixtures of dyes and pigments, and the like, and preferably pigments.

Dry powder additives that can be added or blended onto the surface of the toner compositions preferably after washing or drying include, for example, metal salts, metal salts of fatty acids, colloidal silicas, metal oxides like titanium, tin and the like, mixtures thereof and the like, which additives are each usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and flow aids, such as fumed silicas like AEROSIL R972® available from Degussa, or silicas available from Cabot Corporation or Degussa Chemicals, the coated silicas of U.S. Pat. No. 6,004,714 and U.S. Pat. No. 6,190,815, the disclosures of which are totally incorporated herein by reference, and the like, each in amounts of from about 0.1 to about 2 percent, which can be added during the aggregation process or blended into the formed toner product.

Developer compositions can be prepared by mixing the toners with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

With further respect to the present invention in embodiments thereof illustrative examples of resin, polymer or polymers selected for the process of the present invention and present in the latex (i) or added latex include known polymers, such as acrylates, methacrylates, polyesters like poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner compositions in various suitable amounts, such as from about 75 to about 98 weight percent, or from about 80 to about 95 weight percent of the toner or of the solids, and the latex size suitable for the processes of the present invention can be, for example, from about 0.05 micron to about 0.5 micron in volume average diameter as measured by the Brookhaven nanosize particle analyzer. Other sizes and effective amounts of latex polymer may be selected in embodiments. The total of all toner components, such as resin, calcium stearate, and colorant, is about 100 percent, or about 100 parts.

The polymer selected for the process of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol, from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes.

Examples of optional waxes include those as illustrated herein, polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected possess, it is believed, a molecular weight $M_W$ of from about 1,000 to about 1,500, while the commercially available polypropylenes utilized for the toner compositions of the present invention are believed to have a molecular weight of from about 4,000 to about 5,000. Examples of functionalized waxes include, such as amines, amides, for example AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro is Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and SC Johnson wax.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent, and more specifically, from about 0.2 to about 5 percent (weight percent). Examples of organic soluble initiators include Vazo peroxides, such as VAZO 64™, 2-methyl 2-2'-azobis propanenitrile, and VAZO 88™, 2-2'-azobis isobutyramide dehydrate in a suitable amount, such as in the range of from about 0.1 to about 8 percent. Examples of chain transfer agents include dodecanethiol, octanethiol, carbon tetrabromide, and the like in various suitable amounts, such as in an amount of from about 0.1 to about 10 percent, and more specifically, from about 0.2 to about 5 percent by weight of monomer.

Surfactants for the preparation of latexes and colorant dispersions can be ionic or nonionic surfactants in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, selected in effective amounts of, for example, from about 0.01 percent to about 10 percent by weight. The molar ratio of the cationic surfactant used for flocculation to the anionic surfactant used in the latex preparation is, for example, from about 0.5 to about 4.

Examples of nonionic surfactants selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The following Examples are presented.

EXAMPLE I

Preparation of Sodio Sulfonated Polyesters

A linear sulfonated random copolyester resin comprised of, on a mol percent, 0.465 of terephthalate, 0.035 of sodium sulfoisophthalate, 0.475 of 1,2-propanediol, and 0.025 of diethylene glycol was prepared as follows. In a 5 gallon Parr reactor equipped with a bottom drain valve, double turbine agitator, and distillation receiver with a cold water condenser were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate were collected in the distillation receiver, and which distillate was comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mol percent sulfonated polyester resin, sodio salt of (1,2-propylene-dipropylene-5-sulfoisophthalate)-copoly(1,2-propylene-dipropylene terephthalate). The sulfonated polyester resin glass transition temperature was measured to be 56.6° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent.

Preparation of a Sodio Sulfonated Polyester Colloid Solution

A 15 percent solids concentration of a colloidal solution of sodio-sulfonated polyester resin particles with particle diameter sizes of from about 5 to about 150 nanometers, and typically about 20 to about 40 nanometers dissipated in 85 percent aqueous media of water was prepared by first heating about 2 liters of deionized water to about 85° C. with stirring, and adding thereto 300 grams of the above prepared sulfonated polyester resin, followed by continued heating at about 85° C., and stirring of the mixture for a duration of from about one to about two hours, followed by cooling to about room temperature, about 25° C. throughout the Examples. The colloidal solution of sodio-sulfonated polyester resin particles possessed a characteristic blue tinge and particle sizes of from about 5 to about 150 nanometers, and typically of about 20 to about 40 nanometers, as measured by the NiCOMP® particle sizer.

EXAMPLE II

A 6 Micron Cyan Non-Surface-Treated Toner Comprised of a Linear Sulfonated Polyester Core Resin and Pigment Blue 15:3™ Colorant A 2 liter colloidal solution containing 15 percent by weight of the sodio sulfonated polyester resin of Example I was charged into a 4 liter kettle equipped with a mechanical stirrer. To this were added 42 grams of a cyan pigment dispersion containing 30 percent by weight of Pigment Blue 15:3™ (available from Sun Chemicals) dissipated in 70 percent water, and the resulting mixture was heated to 56° C. with stirring at about 180 to about 200 revolutions per minute. To this heated mixture were then added dropwise 760 grams of an aqueous solution containing 5 percent by weight of zinc acetate dihydrate. The dropwise addition of the zinc acetate dihydrate solution was accomplished utilizing a peristaltic pump at a rate of addition of approximately 2.5 milliliters per minute. After the addition was complete (about 5 hours), the mixture was stirred for an additional 3 hours. A sample (about 1 gram) of the reaction mixture was then retrieved from the kettle, and a particle diameter size of 5.9 microns with a GSD of 1.18 was measured by the Coulter Counter. The mixture was then allowed to cool to room temperature, about 25° C., overnight, about 18 hours, with stirring. The product was filtered off through a 3 micron hydrophobic membrane cloth, and the toner cake was reslurried into about 2 liters of deionized water and stirred for about 1 hour. The toner slurry was refiltered and the cake redispersed into about 1.5 liters of deionized water, to provide a final slurry concentration of about 20 percent toner solids. The toner slurry had a conductivity of about 150 microsiemens per centimeter measured by the Accumet® AR20 pH/conductivity meter (Fisher Scientific), and was set aside for chemical surface treatment as illustrated herein.

EXAMPLE III

Chemical Surface Treatment of a 6 Micron Cyan Toner with 0.04 Percent by Weight of Calcium Stearate A 394 gram portion of the cyan 6 micron toner slurry prepared in the Example above, which was diluted to 10.2 percent toner solids, or 40 grams of toner, was subjected to chemical surface treatment with calcium stearate at a concentration of 0.04 percent by weight of toner solids. The amount of calcium stearate added for a 0.04 percent surface treatment was 0.016 gram, which was delivered as a 0.005 percent (wt/wt) solution of calcium stearate in deionized water. The calcium stearate aqueous solution was prepared by mixing 0.016 gram of calcium stearate into 320 millimeters of deionized water (DIW) and heating to 40° C. to aid dissolution. Once dissolved, the calcium stearate solution was held at 40° C. A sample of the toner slurry containing 40 grams of cyan 6 micron toner solids in 394 grams of water was charged into a 1 liter resin kettle, mechanically stirred at 190 to 200 rpm and heated to 40° C. at a heating rate of about 0.75° C./minute. Once at 40° C., the calcium stearate aqueous solution was added dropwise to the toner slurry at an approximate rate of 0.7 milliliter per minute. The slurry resulting was subsequently stirred for an additional 60 minutes, and then cooled to room temperature. The cooled surface-treated toner slurry was first sieved through a 25 micron stainless steel screen (#500 mesh), and then filtered through a 3 micron hydrophobic membrane cloth. The resulting toner cake was then reslurried into 0.5 to 1 liter of deionized water, stirred for 30 minutes, then filtered again. The solution conductivity of the filtrate was measured to be about 40 microsiemens per centimeter which indicated that the washing procedure was sufficient. (Typically, when the filtrate conductivity was measured to be less than or equal to 50 microsiemens per centimeter, the washing/filtering procedures were terminated.) The surface-treated toner cake was redispersed into 200 milliliters of deionized water, and freeze-dried over 48 hours. The final dry yield of chemically calcium stearate treated toner was measured to be 31 grams or 78 percent recovery. The dry toner, which was comprised of 95.96 percent sodio sulfonated polyester resin, 4 percent Pigment Blue 15:3 and 0.04 percent calcium stearate, had glass transition temperatures of 56.6° C. (onset), 61.5° C. (midpoint), and 66.5° C. (offset).

EXAMPLE IV

Chemical Surface Treatment of a 6 Micron Cyan Toner with 1 Percent by Weight of Stearyltributylphosphonium Bromide (STBP-Br)

A 1,000 gram portion of the cyan 6 micron toner slurry prepared in Example II, which was diluted to 12 percent toner solids, or 120 grams of toner, was subjected to chemical surface treatment with stearyltributylphosphonium bromide (STBP-Br) at a concentration of 1 percent by weight of toner solids. The amount of STBP-Br salt for 1 percent surface treatment was 1.2 gram, which was delivered as a 1 percent (wt/wt) solution of STBP-bromide in deionized water. The STBP-Br aqueous solution was prepared by mixing 1.2 gram of STBP-bromide into 120 millimeters of deionized water (DIW) and heating to 50° C. to aid dissolution. Once dissolved, the STBP solution was cooled to room temperature (about 25° C.). A sample of the toner slurry containing 120 grams of cyan 6 micron toner solids in 1,000 grams of water was charged into a 2 liter resin kettle and was mechanically stirred at about 190 to about 200 rpm and treated at room temperature. The STBP-Br aqueous solution was added dropwise to the toner slurry at an approximate rate of 1 milliliter per minute. The slurry resulting was subsequently stirred for an additional 30 minutes. The surface-treated toner slurry was first sieved through a 25 micron stainless steel screen (#500 mesh), and then filtered through a 3 micron hydrophobic membrane cloth. The resulting toner cake was then reslurried into about 0.5 to about 1 liter of deionized water, stirred for 30 minutes, then filtered again. The solution conductivity of the filtrate was measured to be about 10 microsiemens per centimeter which indicated that the washing procedure was sufficient. (Typically, when the filtrate conductivity was measured to be less than or equal to 50 microsiemens per centimeter, the washing/filtering procedures were terminated.) The surface-treated toner cake was redispersed into 500 milliliters of deionized water, and freeze-dried over 48 hours. The final dry yield of chemically STBP-Br treated toner was measured to be 116 grams. The dry toner of this Example IV containing 95 percent sodio sulfonated polyester resin, 4 percent Pigment Blue 15:3 and 1 percent stearyltributylphosphonium bromide had a glass transition temperature of 53° C. (onset), 57.7° C. (midpoint), and 62.3° C. (offset).

Cohesion Tests

A Hosokawa powder characteristics tester was employed to measure the percent of cohesion of the above toners. Two grams of 6 micron cyan toner with 0.04 percent by weight of calcium stearate toner and 2 grams of 6 micron cyan toner with 1 percent by weight of stearyltributylphosphonium bromide (STBP-Br) was conditioned overnight for 18 hours in B zone, (50 percent RH/22° C.) and then placed on the top sieve of a stack consisting of three sieves. Using three sieves with progressively smaller screen sizes of 54, 45 and 38 microns, respectively, the toner passed through the sieves utilizing a vibration of ⅙ millimeter. The amount of toner collected on each sieve after 90 seconds of vibration was used to calculate the percent cohesion. A lower cohesion was reflective of proportionally better flow. Visual inspection of calcium stearate-treated toner revealed no sign of clumping and indicated excellent flow. The values of percent cohesion determined according to the above procedure are tabulated in Table 1. The calcium stearate-treated toner was significantly less cohesive than the STBP-treated or non-treated toner, and thus had much better flow, showing a 26 to 35 percent improvement, respectively. A better flowing toner reduced the amount of flow aid added to the toner.

TABLE 1

| Toner | Treatment | % Cohesion |
| --- | --- | --- |
| Example I | No Treatment | 99.4 |
| Example III | CaStearate | 64.6 |
| Example IV | STBP | 87.9 |

Triboelectric Charging Properties

Developers were prepared by mixing each of the above toners with a 65 micron Hoeganaes steel core coated with 1 percent by weight of a composite of a polymer of PMMA (polymethyl methacrylate) and conditioned overnight (about 18 hours) at 20 percent and 80 percent RH and charged for 30 minutes on a roll mill. For 5 to 6 micron toners, the toner concentration was 4 percent by weight of carrier. Triboelectric charge was measured by the Faraday Cage blow-off technique, and the charging results for the nontreated toner described in the Example above and chemically surface-treated toners described in Examples I and II are shown in Table 2. The calcium stearate surface treated toner changed the sign of the toner charge from negative to positive, which can enable xerographic developers with positive toner charges.

TABLE 2

| Toner | Treatment | C zone | A zone | RH ratio |
| --- | --- | --- | --- | --- |
| Example I | No Treatment | −175.0 | −7.2 | 24.3 |
| Example IV | 1% STBP | −106.7 | −42.4 | 2.5 |
| Example III | 0.04% CaStearate | 13.0 | 7.0 | 1.9 |

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process comprising heating a sulfonated polyester resin latex and a colorant below about the glass transition temperature (Tg) of the sulfonated polyester resin, adding a metal stearate to the resulting slurry, and isolating the product, and wherein said heating generates an alkyl carboxylate metal salt component ionically attached to the surface of said product.

2. A process in accordance with claim 1 wherein said latex is an emulsion comprised of resin, water, and an ionic surfactant, and wherein said colorant is a dispersion containing a colorant, water, and an ionic surfactant.

3. A process in accordance with claim 1 wherein said resin is comprised of a colloidal solution of said sulfonated polyester resin and water, and further including an aqueous solution selected from the group consisting of an alkaline earth metal (II) salt and a transition metal salt to coalesce and ionically complex the sulfonated polyester colloid, colorant, and metal cation resulting from said alkaline earth metal or said transition metal salt.

4. A process in accordance with claim 1 wherein said metal stearate is calcium stearate selected in an amount of from about 0.005 to about 5 weight percent, and wherein said alkyl carboxylate metal salt is calcium carboxylate.

5. A process in accordance with claim 1 wherein said stearate is selected in an amount of from about 0.005 to about 3 weight percent.

6. A process in accordance with claim 1 wherein said stearate is calcium stearate selected in an amount of from about 0.05 to about 1 weight percent.

7. A process in accordance with claim 1 wherein said stearate is calcium stearate added in the form of a fine powder.

8. A process in accordance with claim 1 wherein said stearate is calcium stearate added to the mixture followed by heating.

9. A process in accordance with claim 8 wherein said heating is from about 35° C. to about 50° C.

10. A process in accordance with claim 8 wherein said heating is from about 35° C. to about 45° C.

11. A process in accordance with claim 8 wherein said calcium stearate is added from a dilute solution thereof.

12. A process in accordance with claim 11 wherein said diluted solution is added at a rate of about 0.5 to about 2 milliliters per minute for each 100 grams of toner solids of resin and colorant.

13. A process in accordance with claim 1 wherein said heating is at about 40° C., and said stearate is added at a rate of about 0.7 milliliter per minute for each 100 grams of toner solids of resin and colorant.

14. A process in accordance with claim 1 wherein the polyester is present in an amount of from about 80 to about 98 percent by weight of said product and which product is a toner; the colorant is present in an amount of from about 2 to about 20 weight percent of the toner, and the alkyl carboxylate component is present in an amount of from about 0.005 to about 5 weight percent of the toner.

15. A process in accordance with claim 1 wherein there is added to the mixture a second latex, and which latex is comprised of submicron resin particles suspended in an aqueous phase containing an ionic surfactant, and wherein said second latex is optionally selected in an amount of about 10 to about 40 percent by weight of the initial latex.

16. A process in accordance with claim 1 comprising (i) preparing a colloidal solution of a sulfonated polyester resin by heating in water at a temperature of from about 75° C. to about 95° C., and cooling; (ii) adding thereto a colorant, followed by heating the resulting mixture to a temperature above the polyester resin glass transition temperature; (iii) adding thereto an aqueous solution of alkaline earth metal (ii) salt or a transition metal salt whereby the coalescence and ionic complexation of sulfonated polyester colloid, colorant, and metal cation is accomplished; and (iv) chemically treating said resulting toner particles in the resulting heated aqueous slurry at a temperature of about 25° C. to about 60° C. with an aqueous solution of said alkyl carboxylate salt which is present in an amount of from about 0.005 to about 5 weight percent of the toner.

17. A process in accordance with claim 1 wherein said temperature below about said sulfonated polyester resin is from about 40° C. to about 60° C., thereby resulting in toner aggregates, further heating above about said sulfonated polyester resin Tg, and which heating is from about 65° C. to about 75° C.

18. A process in accordance with claim 17 wherein the temperature at which the aggregation is accomplished controls the size of the aggregates, and wherein the product is a toner and is from about 2 to about 15 microns in volume average diameter.

19. A process in accordance with claim 1 wherein the colorant is a pigment.

20. A process in accordance with claim 1 wherein the latex further contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid).

21. A process in accordance with claim 1 wherein the sulfonated polyester (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio or copoly-(propoxylated bisphenol A)-copoly-(propoxylated bisphenol A-sodio 5-sulfoisophthalate).

22. A process in accordance with claim 1 wherein the colorant is carbon black, cyan, yellow, magenta, or mixtures thereof, and the product isolated is a toner of from about 2 to about 25 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner.

23. A toner process comprising mixing a sulfonated polyester resin with a colorant; heating the resulting mixture below the glass transition temperature (Tg) of the sulfonated polyester resin; heating above the Tg of the sulfonated polyester resin; and subsequently adding a metal stearate.

24. A process in accordance with claim 23 wherein said colorant is a mixture comprised of about 20 to about 60 weight percent solids of resin and colorant, and which resin is a latex dispersion, and wherein there results a toner containing as an ionically complexed surface additive said stearate.

25. A process in accordance with claim 23 wherein said stearate is calcium stearate.

26. A process in accordance with claim 23 wherein said stearate is magnesium stearate.

27. A process in accordance with claim 23 wherein said stearate is aluminum stearate.

28. A process in accordance with claim 23 wherein said stearate is zinc stearate.

29. A process in accordance with claim 24 wherein said ionically complexed additive is an alkylcarboxylate.

30. A process in accordance with claim 23 wherein said metal stearate is an alkaline earth salt.

31. A process in accordance with claim 1 wherein said stearate is calcium stearate, or magnesium stearate.

32. A process in accordance with claim 1 wherein said stearate is aluminum stearate.

33. A process in accordance with claim 1 wherein said alkyl carboxylate is sodium octanoate, lithium palmitate, magnesium stearate, sodium palmitate, calcium 2-ethylhexanoate, sodium butyrate or calcium propionate.

34. A process in accordance with claim 1 wherein said polyester resin is poly(1,2-propylene-sodio 5-sulfoisophthalate).

35. A process in accordance with claim 1 wherein said polyester resin is polyneopentylene-sodio 5-sulfoisophthalate polyester.

36. A process comprising heating a polyester resin, colorant and a metal stearate, which heating includes a first heating at a temperature below the Tg of said resin, and a second heating above the Tg of the polyester resin; and thereafter optionally isolating the product.

37. A process in accordance with claim 36 wherein said product is a toner, and which toner is isolated.

38. A process in accordance with claim 1 wherein said product is a toner, and which toner is comprised of said sulfonated polyester resin, said colorant, and said alkyl carboxylate metal salt.

39. A process in accordance with claim 36 wherein said product is a toner, and which toner is comprised of said sulfonated polyester resin, said colorant, and said alkyl carboxylate metal salt.

40. A process in accordance with claim 1 wherein said product is a toner and wherein said sulfonated polyester is of the formula

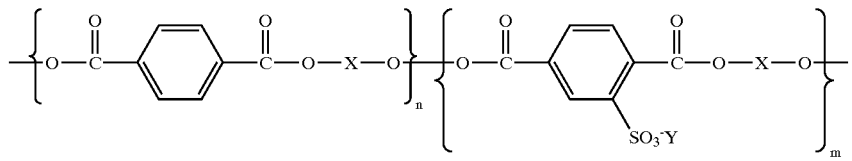

wherein Y is an alkali metal, X is a glycol, and n and m each represent the number of segments.

* * * * *